United States Patent
Frey

(10) Patent No.: US 9,403,220 B2
(45) Date of Patent: Aug. 2, 2016

(54) TWIST TOP HOLE SAW

(71) Applicant: Phillip Clark Frey, Bigfork, MT (US)

(72) Inventor: Phillip Clark Frey, Bigfork, MT (US)

( * ) Notice: Subject to any disclaimer, the term of this patent is extended or adjusted under 35 U.S.C. 154(b) by 414 days.

(21) Appl. No.: 13/739,348

(22) Filed: Jan. 11, 2013

(65) Prior Publication Data

US 2013/0280000 A1 Oct. 24, 2013

Related U.S. Application Data

(60) Provisional application No. 61/687,245, filed on Apr. 23, 2012.

(51) Int. Cl.
*B23B 51/04* (2006.01)
*B23B 51/05* (2006.01)

(52) U.S. Cl.
CPC .............. *B23B 51/05* (2013.01); *B23B 51/0453* (2013.01); *B23B 51/0473* (2013.01); *B23B 2240/04* (2013.01); *Y10T 408/895* (2015.01)

(58) Field of Classification Search
CPC ............ B23B 51/0473; B23B 51/0453; Y10T 408/895; Y10T 408/51
USPC .................................................. 408/204, 68
See application file for complete search history.

(56) References Cited

U.S. PATENT DOCUMENTS

| | | | | |
|---|---|---|---|---|
| 3,037,764 A | * | 6/1962 | Paulsen | 267/292 |
| 3,564,969 A | * | 2/1971 | Kimmelaar | 409/232 |
| 4,303,357 A | * | 12/1981 | Makar | 408/204 |
| 4,978,255 A | * | 12/1990 | Gale et al. | 408/1 R |
| 5,934,845 A | * | 8/1999 | Frey | 408/68 |
| 2002/0122703 A1 | * | 9/2002 | Czyzewski et al. | 408/1 R |
| 2009/0136310 A1 | * | 5/2009 | Naughton et al. | 408/204 |
| 2009/0214310 A1 | * | 8/2009 | Chao | 408/204 |
| 2010/0080665 A1 | * | 4/2010 | Keightley | 408/204 |
| 2011/0097169 A1 | * | 4/2011 | Kazda et al. | 408/204 |
| 2011/0262237 A1 | * | 10/2011 | Baratta | 408/204 |

\* cited by examiner

*Primary Examiner* — Sunil K Singh
*Assistant Examiner* — Chwen-Wei Su

(57) ABSTRACT

There is disclosed a camber-lock apparatus that provides for both joining and separating a two part hole saw. Said camber-lock apparatus consist of a circuited plate that installs within the boundaries of clasping devises at the top of a cylindrical saw blade. The cylindrical saw blade, with the cutting or teeth edge at the bottom, has a large opening at the top. Within the interior circumference of said opening is attached a series of clasping devices. Said circuited plate, with its attached arbor and pilot bit, comprises the top elements of the saw; which can be rotated into and out of place within the boundaries of said clasping devises. The purpose for removal of said circuited plate is to exposes the interior of the saw and any material jammed therein; thereby allowing for easy removal of said material.

2 Claims, 3 Drawing Sheets

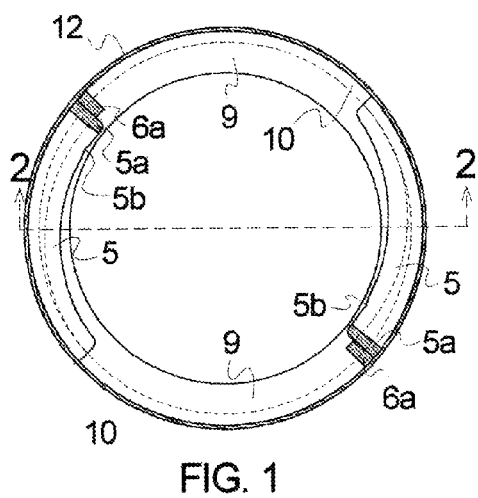
FIG. 1
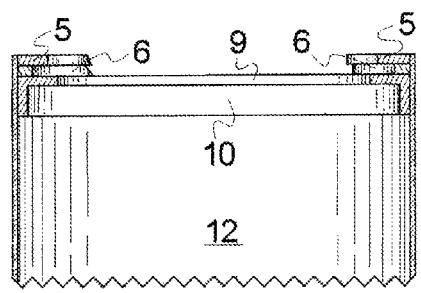
FIG. 2
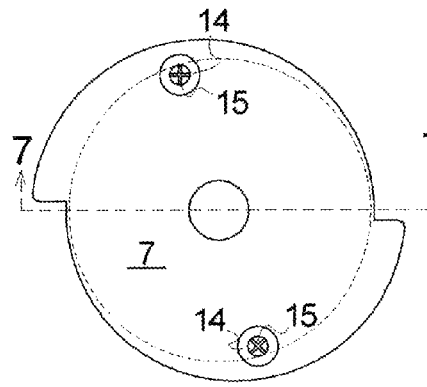
FIG. 6
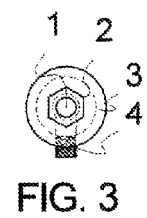
FIG. 3
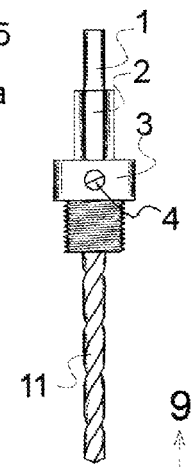
FIG. 4
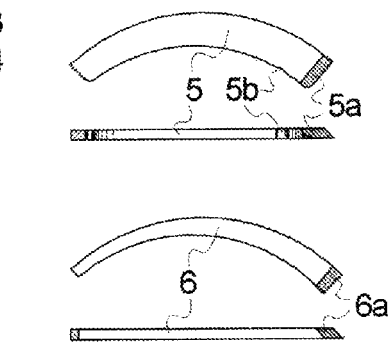
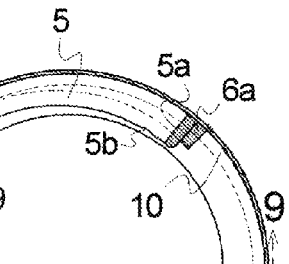
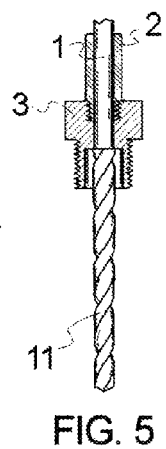
FIG. 5
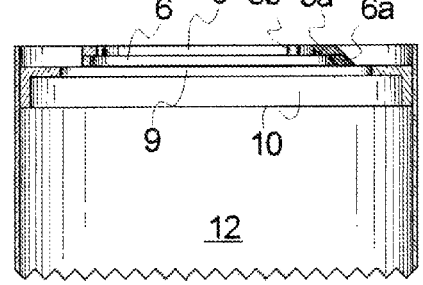
FIG. 8
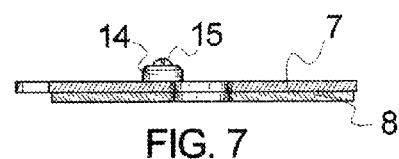
FIG. 9
FIG. 7

TWIST TOP HOLE SAW

CROSS-REFERENCE TO RELATED APPLICATIONS

This application claims the benefit of U.S. patent application Ser. No. 61/687,245 filed Apr. 23, 2012.

STATEMENT REGARDING FEDERALLY SPONSORED RESEARCH OF DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTORNIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION (1) Field of the Invention

The present invention is in the technical field of hand carpentry tools, more particularly a hole saw.

(2) Description of Related Art

The basic hole saw is comprised of a cylindrical saw blade generally several inches in length and of varying inches in circumference. The top of the saw consists of a flat disk fused to the interior circumference at the top end of a cylindrical saw blade. The bottom of the saw, displaying saw teeth, is on the opposite end of the cylinder. In the center of said disk is a threaded hole in which an arbor is inserted. A drill bit, as the pilot bit, passes through the arbor extending downward through the center of the cylinder slightly past the bottom of the saw. These saws generally retain, within the cavity of the cylindrical saw blade, that portion, or core, of the material that the saw has penetrated. This core is usually difficult to remove due to the limited tolerances between the core and the saw blade, and between the core and the pilot. This invention will provide a method for easy access to and removal of that core.

BRIEF SUMMARY OF THE INVENTION

The disclosed embodiment of this invention, a camber-lock apparatus, is designed to facilitate both the joining and separating of a two part hole saw. The hole saw referenced here is of the basic design. That is, a cylindrical saw blade with the teeth or cutting end referred to as the bottom and a disk or plate covering the opening at the opposite end of the cylinder referred to as the top. Centered in the top is threaded an arbor extending upward and through which a pilot bit protrudes downward through the center of the cylinder extending slightly past the bottom of the saw.

However, this invention significantly improves on this basic design in that it incorporates, within the top perimeter of the saw blade, a clasping device that provides for both joining and separating the saw's top surface to and from the top end of the saw blade. This is made possible by a uniquely designed circuited metal plate, displaying cambering features along its edges, as the top. This plate fits within the boundaries of said clasping device; giving rise to inventors idiolect, Camber-lock.

After sawing through an object, the plate is detached from the clasping devise and lifted from the top end of the saw. This will extract the pilot bit from any material, or core, that may be jammed within the cavity of the saw blade, while at the same time exposing the greater portion of the top surface of said core. The core will then either fall from the cavity of the saw or can be pushed from the saw with the lite pressure of the thumb or the tap of a hammer.

BRIEF DESCRIPTION OF THE SEVERAL VIEWS OF THE DRAWINGS

FIG. 1 is a top view of the hole saw and clasping device.

FIG. 2 is a cross section view in elevation of the hole saw and clasping device.

FIG. 3 is a top view of the arbor and drill bit.

FIG. 4 is a view in elevation of the arbor and drill bit.

FIG. 5 is a cross section view in elevation of the arbor and drill bit.

FIG. 6 is a top view of the plate.

FIG. 7 is a cross section view in elevation of the plate.

FIG. 8 shows the stacking sequence and placement of the clasping device.

FIG. 9 is a cross section view in elevation of the hole saw and clasping device.

DETAILED DESCRIPTION OF THE INVENTION

The version of the invention discussed here includes:

1. A drill bit shank—Bit Shank
2. A six sided metal shaft center drilled for a drill bit shank—Hex Shank
3. A metal cylinder center drilled and threaded, then tapped for a set screw on the side. The lower portion reduced in diameter and threaded, then a cavity drilled into its center—Collar
4. Set Screw.
5. A planar-curved metal strip—Plate Guide.
    Beveled edge to 5 above—5*a*.
    Concave indent near beveled end of 5 above—Locking Indent 5*b*.
6. A planar-curved metal strip —Plate Stop.
    Beveled edge to 6 above—6*a*
7. A circuited metal plate with diametrically opposing curved edges. Each half of the plate slightly off-set, along centerline, from the other half, thereby displaying a slight change in radii along the plates outer edges relative to actual center—Plate.
8. Circular metal disk—Plate Centering Disk.
9. Flat metal ring with a large centralized circular opening—Base Ring.

10. Skirt attached to the Base Ring—Base Ring Skirt.
11. Tapered drill bit—Pilot Bit.
12. Cylindrical metal saw blade—Saw Blade.
13. Spacing between Plate Guide and Base Ring—Groove
14. Compressible ring—Locking Ring.
15. Round head bolt—Locking Ring Bolt.

The invention consists of two primary units: A circuited metal plate with centering disk, arbor, pilot bit and locking rings, hereinafter Plate Unit, and a flat metal ring upon which plate holding, or clasping devices, are attached; together comprising a camber-lock apparatus.

Arbor Unit, FIGS. 3, 4 & 5: The lower portion of a metal cylinder is reduced in diameter and threaded. A large hole is drilled lengthwise into the center of the threaded section creating a cavity. A center-threaded hole is drilled into the top portion of the cylinder. A smaller hole, that will accept a Bit Shank 1, is continued through the cylinder. To secure this Bit Shank 1, a threaded hole is drilled into the side of the upper section of the cylinder and a Set Screw 4 is placed therein. This completes the manufacturing of the Collar 3.

A hole is drilled lengthwise through the center of a Hex Shank 2. The lower portion of the Hex Shank 2 is threaded to fit into the top of the Collar 3. The Hex Shank 2 is screwed into the top of the Collar 3. The Bit Shank 1 of the Pilot Bit 11 is inserted through the center of the Collar 3 and Hex Shank 2 and is secured with a Set Screw 4.

Figure 15:
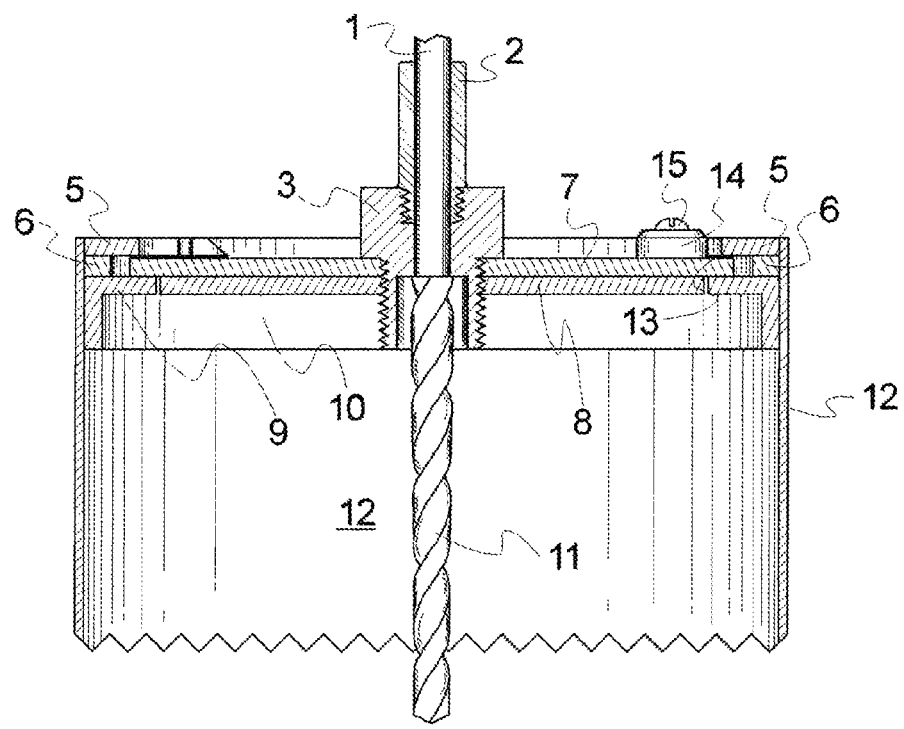
FIG. 15 is a cross section view in elevation of the hole saw

Saw Unit, FIGS. 1 & 2: A flat metal ring with a large centralized circular opening, hereinafter Base Ring 9, has the outer circumference of said Base Ring 9 turned down ninety degrees to form a skirt, thereby forming the Base Ring 9 with its Base Ring Skirt 10, FIGS. 1, 2, 9 & 15. The top of a cylindrical metal Saw Blade 12 is wrapped around and attached to the Base Ring 9 and the Base Ring Skirt 10. A portion of the Saw Blade 12 will extend upward past the Base Ring 9, a length necessary to contact the convex edges of the Plate Stops 6 and Plate Guides 5, as shown in FIGS. 2, 9 & 15.

Clasping device, FIGS. 1, 8, 9, 13 & 14: The Plate Stops 6, consisting of at least two planar-curved metal strips, slightly increasing in width along their lengths and beveled at the wide end 6a, are attached, at diametrically opposed locations, to the top of the Base Ring 9. The Plate Guides 5, consisting of at least two planar-curved metal strips slightly increasing in width along their lengths and beveled at the wide end 5a, are stacked on and attached to the top of the Plate Stops 6, with their concave edges slightly overlapping the Plate Stops 6 concave edges; thereby creating grooves 13 between the plate guides 5 and the Base Ring 9. The convex edges of these metal strips are even with the outer edge of the Base Ring 9 and are attached to both the Base Ring 9 and the interior circumference at the upper end of the Saw Blade 12. FIG. 1 shows the concave edges of these metal strips set slightly back from the edge of the centralized circular opening within the Base Ring 9. Each strip displays the same change in radii relative to the center of the Base Ring 9. This results in a change in diameter between diametrically opposing points along their concave edges, as shown in FIGS. 1, 10, 12 & 13. A slight concave indentation, locking indent 5b, is cut into the inner edge of the Plate Guide 5 near the beveled edge 5a. The stacking sequence of the strips is displayed in both elevation and plan view in FIG. 8; with FIG. 9 showing a sectional view in elevation of the assembled parts.

Figure 10:
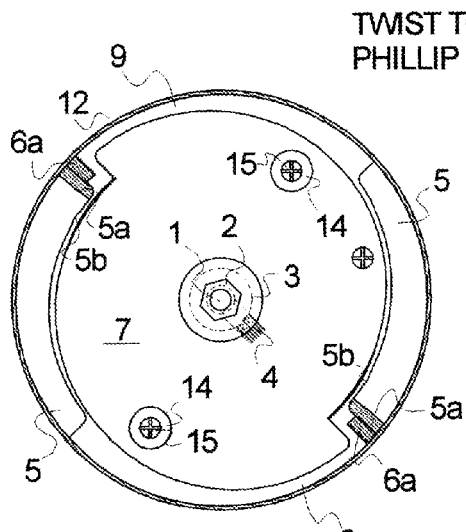
FIG. 10 is a top view of the hole saw with the plate in the unlocked position.
Figure 12:
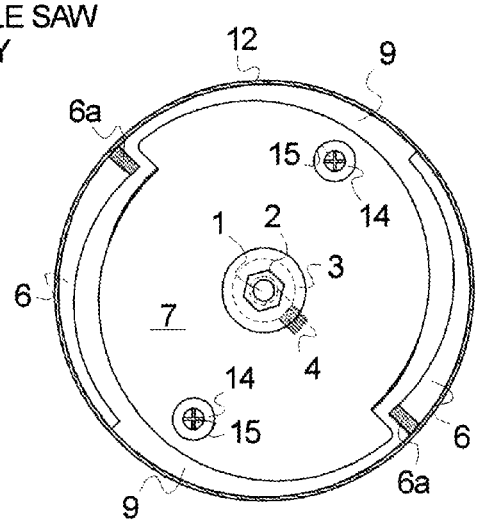
FIG. 12 is a top view of the hole saw with the plate in the unlocked position.
Figure 11:
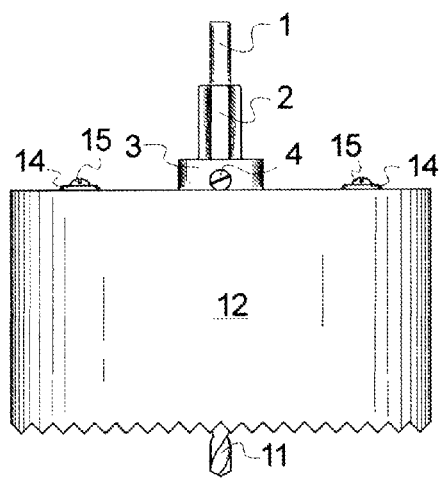
FIG. 11 is a view in elevation of the hole saw.
Figure 13:
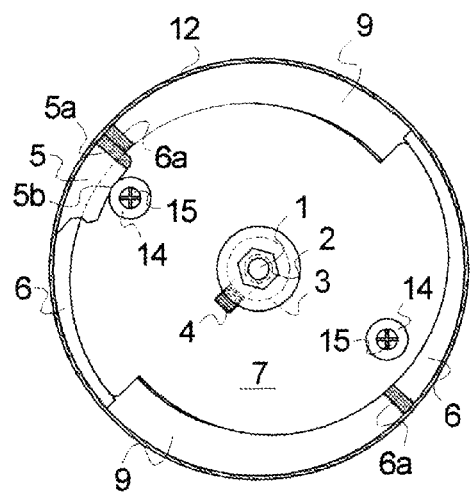
FIG. 13 is a top view of the hole saw with the plate in the locked position.
Figure 14:
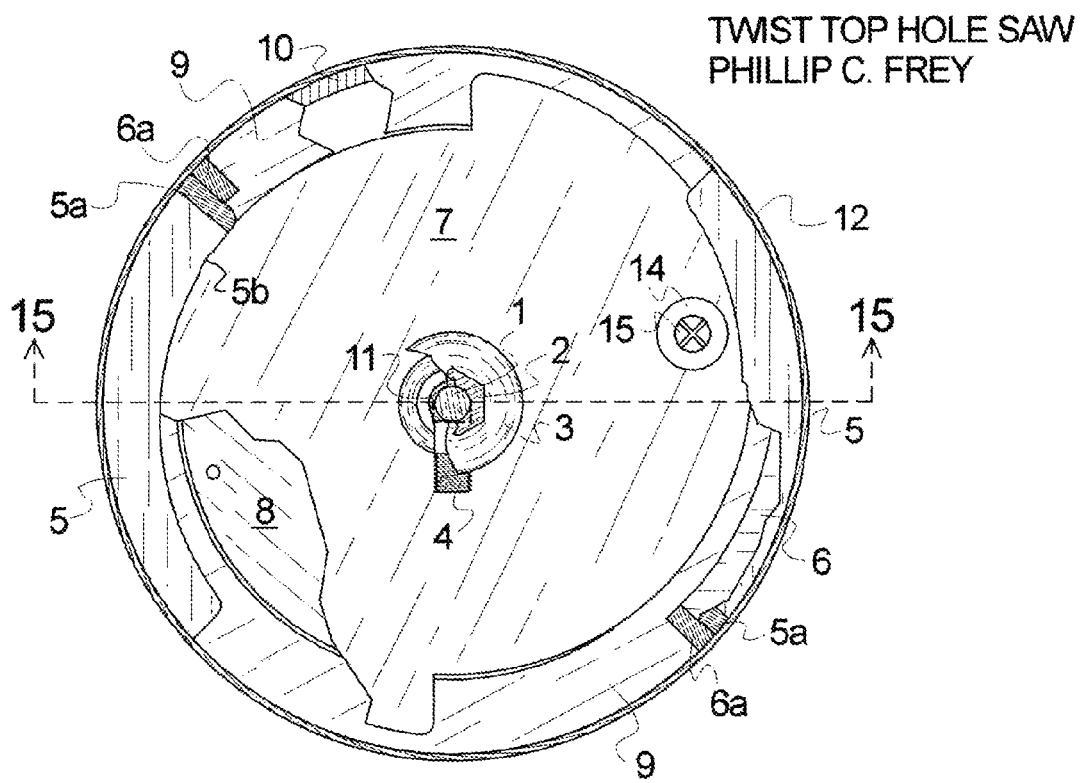
FIG. 14 is a top view of the hole saw.

Plate Unit, FIGS. 6 & 7: A metal plate described as Plate 7 is formed such that it appears as two half disks, joined along a common center line, each slightly offset from center; the result being a circuited metal plate with perimeters exhibiting diametrically opposing changes in radii relative to actual center. These cam like features allow the Plate 7 to be rotated into and locked in place between the Plate Stops 6 and within said Grooves 13, as shown in FIG. 13. FIGS. 10 & 12 shows said Plate 7 in the unlocked position and free to be lifted from the surface of the Base Ring 9. To the bottom of this Plate 7 is centered and attached a circular metal disk described as Plate Centering Disk 8. The Plate Centering Disk 8 is slightly less in circumference than the centralized circular opening in the Base Ring 9 and by closely fitting within the boundaries of said circular opening in the Base Ring 9 is designed to position the Plate 7 on the surface of the Base Ring 9, FIG. 14.

Next, a hole is drilled and threaded through the center of the Plate 7 and the Plate Centering Disk 8; into which an arbor is placed. Two holes, diametrically opposed, are drilled and tapped near the edges of the Plate 7, and a Locking Ring 14 is placed over each hole and secured to the surface of the Plate 7 with a Locking Ring Bolt 15, FIG. 6. The placement of the Locking Ring 14 is such that it will press into the Locking Indent 5b on the Plate Guide 5 when the Plate 7 is rotated to the locked position as shown in FIG. 13.

All portions of the hole saw are now manufactured and assembled as follows: The Collar 3 of the arbor is screwed into the center of the Plate 7 and the Plate Centering Disk 8. The Plate 7 is set on the Base Ring 9 and rotated clockwise until the edges of the Plate 7 slide under the Plate Guides 5 and are clasped between Plate Stops 6, with the Locking Rings 14 coming to rest in the Locking Indents 5b, as shown in FIG. 13. The Plate Stops 6 are slightly thicker than the Plate 7 so as to allow sufficient clearance for the Plate 7 to slide between the Base Ring 9 and the Plate Guides 5. There is now an operational hole saw that will cut a circular hole through various materials.

How to use the invention: The assembled hole saw, FIGS. 10, 11, 14 & 15, is attached to a drill by inserting the Hex Shank 2 or the Bit Shank 1 into a drill chuck. The Pilot Bit 11 is pressed against the material through which the saw will penetrate. The drill is activated causing the Pilot Bit 11 to guide the Saw Blade 12 onto and through the selected material. This results in a circular hole being cut through the material, and the core of the material most likely to remain jammed within the cavity of the Saw Blade 12. The hole saw, with the jammed core, is removed from the hole. The chuck of the drill is firmly grasped with one hand and the Saw Blade 12 with the other. The Saw Unit, FIGS. 1 & 2, is twisted clockwise and the chuck, holding either the Hex Shank 2 or the Bit Shank 1, counterclockwise. This disengages the Locking Ring 14 from the Locking Indent 5b and allows the Plate 7 to rotate free of the Plate Stops 6 and the Plate Guides 5. The tapered Pilot Bit 11 has created a slight cone shaped hole in the core. This allows for easy extraction of the Pilot Bit 11 from the core, as the Plate Unit, FIGS. 6 & 7, is lifted from the Base Ring 9. A large portion of the core top is now exposed and can be easily pressed from the interior of the Saw Blade 12; if it has not already fallen free due to the removal of the Pilot Bit 11. In the event the drill is powered in reverse to separate the Plate Unit, FIGS. 6 & 7, from the Saw Unit, FIGS. 1 & 2, the beveled edges 6a and 5a of the Plate Stops 6 and Plate Guides 5 will cause the Plate 7 to ride up and over the Plate Guides 5, again separating the Plate Unit, FIGS. 6 & 7, from the Saw Unit, FIGS. 1 & 2.

All elements are necessary. Further testing may indicate improvements in design and/or materials.

This design is meant to apply to all sizes of hole saws. With the possible exception of the Arbor FIGS. 3, 4 & 5, measurements will be somewhat proportionally adjusted as the diameter of the Saw Blade changes.

I claim:

1. A camber-lock apparatus, providing for both joining and separating a two part hole saw, comprising:
   a flat metal ring with a centralized circular opening;
   a cylindrical saw blade with saw teeth on the bottom end and a circular opening at the top end;
   an arrangement of at least two analogous stackings of planar-curved metal strips, each stacking consisting of two planar-curved metal strips, one atop the other, the top strip slightly wider than the bottom strip, both strips displaying a concave edge and a convex edge;
   wherein said ring is disposed within the interior circumference at the top end of said saw blade, said top end of said saw blade extending slightly past the top surface of said ring;
   wherein attached to the top surface of said ring, and diametrically opposed, is at least one binary arrangement of stacked planar-curved metal strips, their convex edges even with the outer edge of said ring and attached to the interior circumference of said saw blade, their concave edges set slightly back from the edge of said centralized circular opening;
   wherein the strips uniformly exhibit a slight change in radii along said concave edges relative to the center of said ring, and being diametrically opposed, exhibit a slight change in diameter between diametrically opposing points along said concave edges, thereby creating a clasping condition between diametrically opposed strips;
   wherein the narrower of the two strips rests on said ring thereby creating grooves between said ring and the overlying wide strips;
   wherein said groove in association with said clasping condition results in a clasping device.

2. The camber-lock apparatus of claim 1 comprising:
   a circuited metal plate with perimeters exhibiting diametrically opposing changes in radii relative to said plate's actual center, resulting in diametrically opposed cambering features along the edges of said plate;
   a circular metal disk;
   a set of compressible rings;
   wherein said disk, is centered and attached to the underlying surface and within the perimeters of said plate;
   wherein a threaded hole extends through the center of said plate and said disk;
   wherein surface mounted slightly in from said perimeters of said plate are diametrically opposed compressible rings serving as locking rings;
   wherein said disk, being slightly less in circumference than said centralized circular opening, positions said plate on said ring;
   wherein said plate will position within said clasping device by rotating on the surface of said ring until the edges of the plate are established within said grooves and pressed against a concave surface of said bottom strip with said locking rings pressing into indentations on the concave edge of said overlying strips, thereby completing the assembly of the two part hole saw.

* * * * *